United States Patent
Wiggins (10) Patent No.: US 9,710,671 B1
(45) Date of Patent: *Jul. 18, 2017

(54) DATA ANONYMITY AND SEPARATION FOR USER COMPUTATION

(71) Applicant: Amazon Technologies, Inc., Seattle, WA (US)

(72) Inventor: Zachary J. Wiggins, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/588,738

(22) Filed: Jan. 2, 2015

Related U.S. Application Data (63) Continuation of application No. 12/842,487, filed on Jul. 23, 2010, now Pat. No. 8,930,896.

(51) Int. Cl.
| | | |
|---|---|---|
| *G06F 17/30* | (2006.01) | |
| *G06F 21/00* | (2013.01) | |
| *G06Q 40/00* | (2012.01) | |
| *G06F 21/62* | (2013.01) | |
| *H04L 29/06* | (2006.01) | |

(52) U.S. Cl.
CPC .......... *G06F 21/6254* (2013.01); *H04L 63/10* (2013.01)

(58) Field of Classification Search
CPC ... H04L 67/1097; H04L 67/02; G06F 9/4881; G06F 3/0619; G06F 3/067; G06F 21/6254; G06F 8/61; G06F 17/2247; G06F 17/30867; G06F 17/3089; G06Q 10/06

See application file for complete search history.

(56) References Cited

U.S. PATENT DOCUMENTS

| | | | |
|---|---|---|---|
| 4,805,107 A | | 2/1989 | Kieckhafer et al. |
| 5,822,608 A | | 10/1998 | Dieffenderfer et al. |
| 5,841,869 A | * | 11/1998 | Merkling ............. G06F 21/602 |
| | | | 713/164 |
| 6,112,225 A | * | 8/2000 | Kraft ................... G06F 9/5072 |
| | | | 709/201 |

(Continued)

OTHER PUBLICATIONS

Lowet et al., Co-browsing dynamic web pages, Apr. 2009, 10 pages.*

(Continued)

*Primary Examiner* — Thuy Dao
(74) *Attorney, Agent, or Firm* — Lee & Hayes, PLLC (57) ABSTRACT

This disclosure includes techniques for using distributed computing over a network to resolve difficult computational problems. Anonymization of the data allows computing devices in the distributed computing system to solve the computational problem without exposing private aspects of the data. Individual computing devices receive instructions and data that correspond to a piece of a larger computational problem. In one implementation, a user may request a webpage from a web server and receive the webpage along with commands in a scripting language that instructs the user's computer to process a piece of the larger computational problem. The web server may assign the piece of the problem to the user's computer based on processing capabilities of the user's computer. Combining solutions received from multiple distributed computing devices and reversing the anonymization process yields a solution to the computational problem.

20 Claims, 9 Drawing Sheets

(56) References Cited

U.S. PATENT DOCUMENTS

| | | | |
|---|---|---|---|
| 6,185,567 B1 | 2/2001 | Ratnaraj et al. | |
| 6,366,945 B1* | 4/2002 | Fong | G06F 9/5066 |
| | | | 718/104 |
| 6,988,139 B1 | 1/2006 | Jervis et al. | |
| 7,076,534 B1 | 7/2006 | Cleron et al. | |
| 7,076,764 B2 | 7/2006 | Kramer | |
| 7,152,104 B2 | 12/2006 | Musante et al. | |
| 7,434,202 B2 | 10/2008 | Kramer | |
| 7,464,090 B2 | 12/2008 | Betz | |
| 7,565,340 B2 | 7/2009 | Herlocker et al. | |
| 7,590,984 B2 | 9/2009 | Kaufman et al. | |
| 7,650,331 B1 | 1/2010 | Dean et al. | |
| 7,861,222 B2 | 12/2010 | Ramsey et al. | |
| 9,277,064 B2* | 3/2016 | Nakamura | G06F 3/1298 |
| 9,436,542 B2* | 9/2016 | McFate | G06F 9/5027 |
| 9,444,795 B1* | 9/2016 | Kowalski | H04L 63/0428 |
| 9,483,565 B2* | 11/2016 | Tomkins | G06F 17/30867 |
| 2002/0019844 A1 | 2/2002 | Kurowski et al. | |
| 2002/0133536 A1 | 9/2002 | Ramachandran | |
| 2003/0192029 A1 | 10/2003 | Hughes | |
| 2003/0229892 A1 | 12/2003 | Sardera | |
| 2003/0236812 A1 | 12/2003 | Boudnik et al. | |
| 2006/0184626 A1* | 8/2006 | Agapi | G06F 9/505 |
| | | | 709/205 |
| 2006/0248504 A1 | 11/2006 | Hughes | |
| 2007/0006122 A1 | 1/2007 | Bailey et al. | |
| 2007/0025381 A1* | 2/2007 | Feng | G06F 9/505 |
| | | | 370/431 |
| 2007/0110094 A1* | 5/2007 | Tobita | G06F 9/4887 |
| | | | 370/453 |
| 2008/0086442 A1 | 4/2008 | Dasdan et al. | |
| 2008/0127200 A1 | 5/2008 | Richards et al. | |
| 2008/0177726 A1 | 7/2008 | Forbes et al. | |
| 2008/0262969 A1 | 10/2008 | Samid | |
| 2008/0313610 A1 | 12/2008 | Ramsey et al. | |
| 2009/0254917 A1* | 10/2009 | Ohtani | G06F 9/5027 |
| | | | 718/104 |
| 2009/0254998 A1* | 10/2009 | Wilson | G06F 9/5027 |
| | | | 726/27 |
| 2009/0276771 A1 | 11/2009 | Nickolov et al. | |
| 2009/0313635 A1 | 12/2009 | Dasdan | |
| 2010/0175049 A1 | 7/2010 | Ramsey et al. | |
| 2011/0041136 A1 | 2/2011 | Messier et al. | |
| 2011/0087776 A1 | 4/2011 | Tabone et al. | |
| 2011/0088039 A1 | 4/2011 | Tabone et al. | |
| 2011/0191361 A1 | 8/2011 | Gupta et al. | |
| 2012/0131075 A1 | 5/2012 | Mawdsley et al. | |
| 2012/0254966 A1 | 10/2012 | Parker | |

OTHER PUBLICATIONS

J. Horey, A programming framework for integrating web-based spatiotemporal sensor data with MapReduce capabilities, Nov. 2010, 8 pages.*

Cheng et al., "A Web-based distributed problem-solving environment for engineering applications", Elsevier Ltd, Advanced in Engineering Software, No. 37, Mar. 2005, 17 pages.

Li et al., "Distributed anonymous data perturbation method for privacy-preserving data mining", Journal of Zhejiang University—Science A, 10 (7), Apr. 2009, 12 pages.

"MapReduce", Wikipedia Foundation Inc., Retrieved on May 7, 2010 at http://en.wikipedia.org/wiki/Map_reduce, pp. 1-9.

Office action for U.S. Appl. No. 12/842,487, mailed on Nov. 8, 2012, Wiggins, "Data Anonymity and Separation for User Computation", 46 pages.

Office Action for U.S. Appl. No. 12/842,487, mailed on May 8, 2014, Zachary J. Wiggins, "Data Anonymity and Separation for User Computation", 36 pages.

Office action for U.S. Appl. No. 12/842,487, mailed on Jun. 5, 2013, Wiggins , "Data Anonymity and Separation for User Computation", 46 pages.

"Scripting Language", retrieved Nov. 14, 2014 at <<http://en.wikipedia.org/wiki/Scripting_Language>>, Wikipedia, 7 pgs.

Singh et al., "Cooperative Distributed Problem Solving through Ad hoc Agent Coalitions", 2010 1st International Conference on Parallel, Distributed and Grid Computing PDGC-2010, Oct. 2010, 6 pages.

Zhang et al., "Distributed Problem Solving in Sensor Networks", AAMAS'02, at <http://delivery.acm.org/10.1145/550000/544971/p988-zhang.pdf, Jul. 2002, 2 pages.

* cited by examiner

Fig. 8b

DATA ANONYMITY AND SEPARATION FOR USER COMPUTATION

CROSS REFERENCE TO RELATED APPLICATIONS

This is a continuation application which claims priority to commonly assigned, co-pending U.S. patent application Ser. No. 12/842,487, filed Jul. 23, 2010. Application Ser. No. 12/842,487 is fully incorporated herein by reference.

BACKGROUND

The Internet, or any other large computer network, is a valuable resource both because of its flexibility and the large number of interconnected computers. Hierarchies on the Internet are continually being torn down, revised, and replaced by new hierarchies or alternative hierarchical frameworks. In some ways these changing hierarchies have blurred the distinction between server computers and client computers. Traditionally, one computer was the primary source of data and another computer was the primary recipient of data. For example, web pages typically involve a one way flow of information—from a web server to user computers "surfing" the web. However one variation to that hierarchy is a one-to-one exchange of data between two parties such as occurs with instant messaging and voice over internet protocol (VOIP) telephony, in which end users share text or voice communication. Other types of interactions are also possible, such as interactions found in peer-to-peer networks that share files between many different users. Development of new types of hierarchical or non-hierarchical relationships will lead to the emergence of new uses for the Internet.

In some ways the Internet is both nimble and large. Nimble because it can accommodate various hierarchical relationships and large because of the large number of computers from which it is formed. The computers connected to the Internet represent valuable computing resources for the purpose of solving problems in a distributed manner. However, the decentralized nature of the Internet that provides the above-mentioned flexibility makes it difficult to direct this valuable resource in a coordinated manner. Some systems coordinate multiple computers to work together having the users of each of those multiple computers install a special purpose software application. However, participation in these systems is limited to only a small percentage of all the computers connected to the Internet. A novel relationship hierarchy may allow fuller use of the Internet as a resource for distributed computing.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Popular websites such as major portals or large shopping websites may host tens or hundreds of thousands of unique users at one time. Most of these users' computers send a request to a web server for a webpage and receive the webpage. In response, web browser software of the user computers interprets the webpage and displays this page to the user. These same web servers may also have significant computational tasks to complete possibly related to delivering the webpages. Each of the large number of user computers contacting the web servers is more than just a passive recipient of webpages. Those thousands of user computers represent a significant resource that can be managed by the web server as a distributed computing network to solve computational problems for the web server. Many computers accessing websites have processing power and memory that is not fully utilized during normal operation, and thus, the web server can utilize a portion of this processing power and memory without negatively impacting other operations of the user computers.

The multitude of users visiting a large website generally represents a computing resource that is not controlled and cannot be effectively regulated for security and privacy. Unlike distributed computing in a more closely regulated environment, distributed computing implemented on "public" user computers may be limited to only public data that can be freely disseminated. In order to safely use a public, distributed computing system for working on problems involving private data, it may be necessary to anonymize or mask the data. The act of dividing a problem up into many hundreds or thousands pieces may in itself provide a level of anonymity. The web server may additionally apply specific anonymization techniques to the data sent to the user computers to increase security and privacy.

In some implementations described below, each of these user computers may have a web browser capable of interpreting scripting languages (e.g., JavaScript®, Jscript®, ECMAScript, etc.). As such, the web server may provide a distributed computing task in a scripting language for execution by the web browsers with the pre-existing software used for running this type of code. In this type of relationship, the user computers receive web content and the server computer receives temporary use of the processors, memory, and other resources of the user computers. The users of these computers may opt-in to this relationship and possibly receive an incentive from the web server for participating.

Illustrative Architectures and Devices

Figure 1:
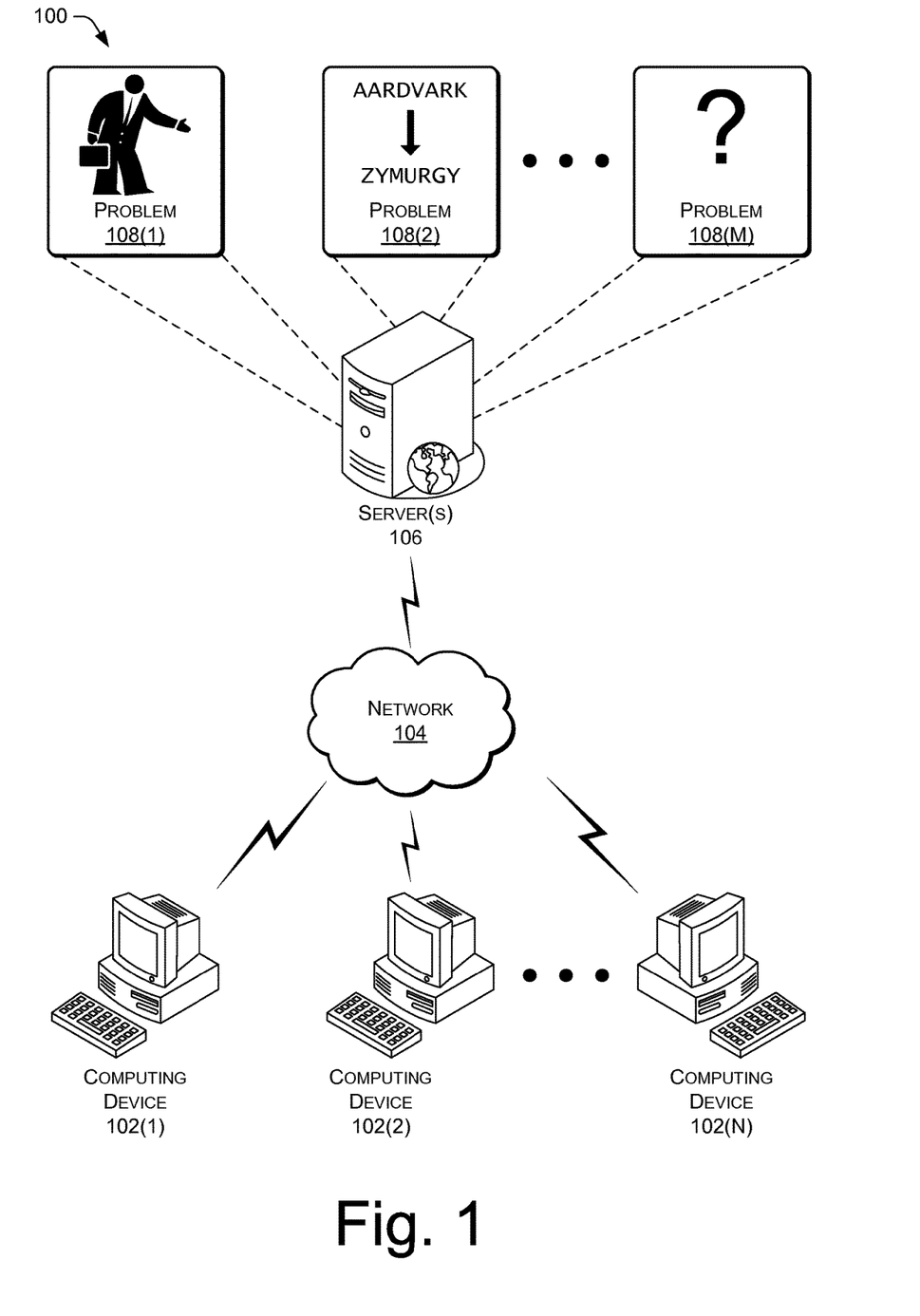
FIG. 1 shows an illustrative architecture for distributing one or more computing problems to multiple computing devices.

FIG. 1 shows an illustrative architecture 100 in which a plurality of computing devices 102(1), 102(2), and 102(N) connect to a network 104, such as the Internet. The computing devices 102(1), 102(2), and 102(N), collectively computing devices 102, may be any device capable of interpreting machine-executable instructions, such as a desktop computer, laptop computer, thin client, gaming console, set-top box, personal digital assistant, cellular phone, electronic book reader, and the like. The computing devices 102 connect to the server(s) 106 via the network 104. The server(s) 106 may be a single computing device or multiple computing devices such as a server farm. In some implementations, the server(s) 106 may be a web server that primarily presents webpages to requesting clients. The server(s) 106 may have more or less functionality and features than the computing devices 102 and, in some implementations, may be the same as one of the computing devices 102.

The server(s) 106 may manage the computing devices 102 as a distributed computing system in which each of the computing devices 102(1)-102(N) operate autonomously and communicate with the server(s) 106 through the network 104. This distributed system consisting of the server(s) 106 and the computing devices 102 may be used to solve difficult or lengthy computational problems by dividing the problem into many tasks, each of which is solved by one or more of the computing devices 102.

The server(s) 106 may have access to any number of problems 108(1), 108(2), and 108(M) awaiting a solution. While the server(s) 106 itself may work on solving the problems 108(1), 108(2), and 108(M) (collectively problems 108), it may be more efficient (e.g., may conserve server(s) 106 resources) and/or otherwise desirable to utilize a distributed computing system comprising the multiple computing devices 102. For example, NP-complete problems can be verified quickly, but there is no known efficient way to identify a solution in the first place. Often, the only way to find an optimal solution is to try each possible combination. For example, the traveling salesman problem—given a list of cities and their pairwise distances, find a shortest possible route that visits each city only once—is one example of an NP-complete problem. This type of optimization problem 108(1) can use a large amount of computing resources, but is amenable to solution by a distributed computing system.

Besides optimization-type problems 108(1), a distributed computing system can also advantageously be used to solve computationally simple problems that involve large amounts of data, such as sorting tetrabytes of data. One example of a sorting problem 108(2) is sorting a list of words in alphabetical order. The words could, for example, represent the title of each book for which an international standard book number (ISBN) exists. Other problems 108(M) either similar or different from those mentioned above may also be solved using distributed computing. One example of another type of problem is removing redundancy from regular expressions. Regular expressions provide concise and flexible techniques to match text such as characters, words, or patterns of characters. It is possible for two different regular expressions to be essentially equal, but there is no method to systematically rewrite regular expressions in a normalized form.

Figure 2:
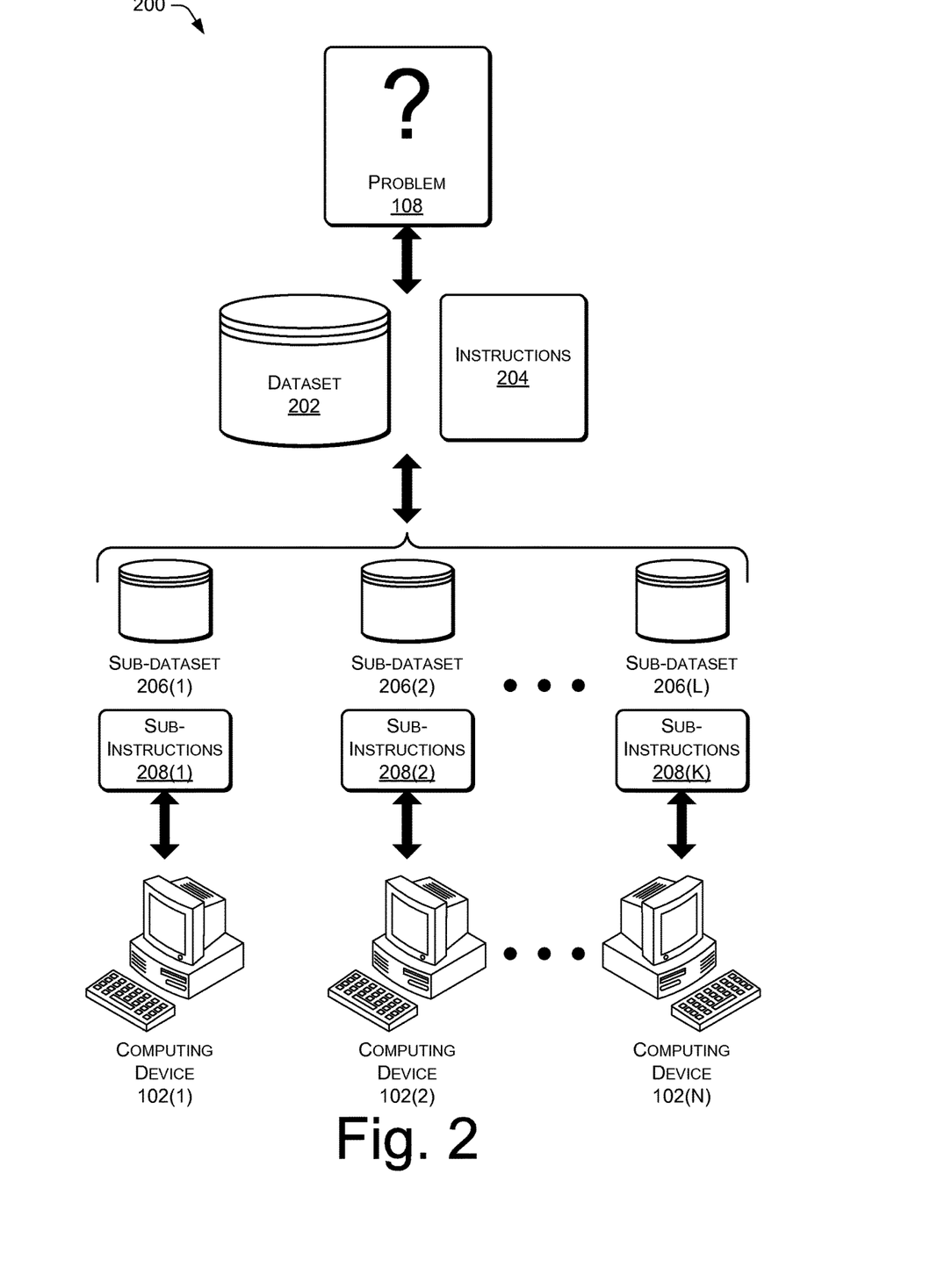
FIG. 2 shows distribution of a dataset associated with one of the illustrative problems from FIG. 1 across multiple computing devices.

FIG. 2 shows a schematic 200 illustrating division of an illustrative problem 108 across multiple computing devices 102(1), 102(2), and 102(N). The problem 108 is associated with a dataset 202 containing the data necessary to solve the problem 108. The dataset 202 may be relatively large if, for example, the problem 108 relates to sorting a large number of entries. Alternatively, the dataset 202 may be relatively small if the problem 108 is solved by computationally intensive manipulations applied to only a modest amount of data such as an optimization problem. Be it large or small, the dataset 202 and instructions 204 for solving the problem 108 may be divided and shared across multiple computing devices 102. The dataset 202 may be divided into multiple sub-datasets 206(1), 206(2), and 206(L). The sub-datasets 206(1), 206(2), and 206(L), collectively sub datasets 206, may each contain the same or different quantities of data. The number of the sub-datasets 206 may equal the number of available computing devices 102 (i.e., L=N) or the number of sub-datasets 206 may be greater or smaller than the number of computing devices 102. The instructions 204 may similarly be divided into multiple sub-instructions sets 208(1), 208(2), and 208(K). Collectively these are the sub-instructions 208.

Each sub-dataset 206 may be assigned to one of multiple computing devices 102. The server(s) 106 may track the allocation of each sub-dataset 206 associated with the problem 108 to ensure that each sub-dataset 206 is eventually assigned to a particular computing device 102 and that a solution is received for each sub-dataset 206. The server(s) 106 may include a log of the sub-datasets 206 that have yet to be assigned, the sub-datasets 206 that have been assigned to a computing device 102 and are awaiting a response, and the sub-datasets 206 for which a solution has been received. If a solution is not received either because the device 102 fails to respond (e.g., times out) or the data received back is inaccurate, corrupted, or otherwise not a "solution," then that sub-dataset 206 and the accompanying sub-instructions 208 may be reassigned to a different computing device 102.

Figure 3:
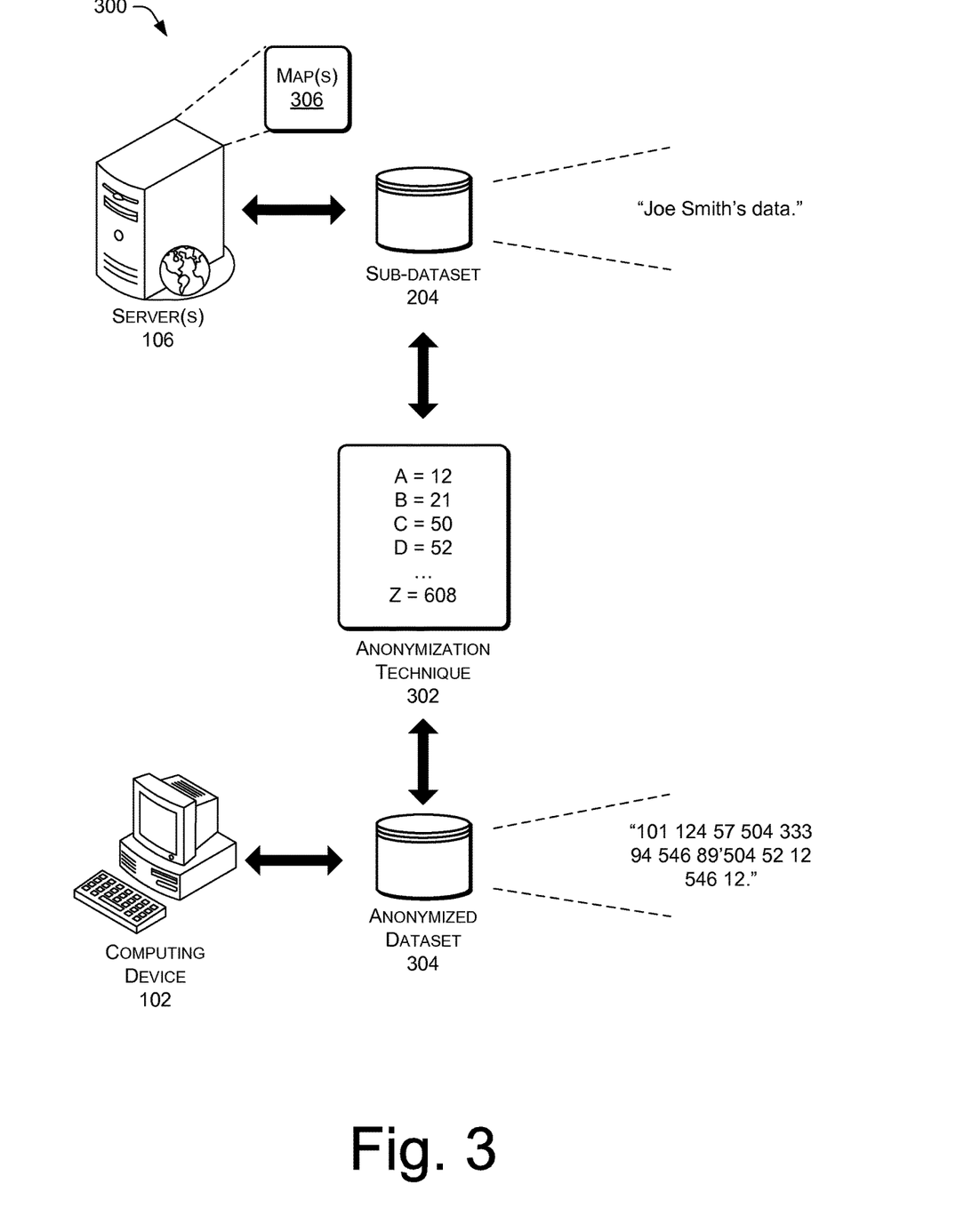
FIG. 3 shows anonymization of a sub-dataset from FIG. 2.

FIG. 3 shows an illustrative architecture for anonymizing data prior to distributing the data to a one of the computing devices 102. Distributing private data across the multiple computing devices 102 shown in FIGS. 1 and 2 may potentially lead to security concerns or loss of privacy. However, encryption may be inappropriate because the data may need to be accessible on some level in order for the distributed computing system to process the data and compute a solution to the problem 108. The server(s) 106 may define a sub-dataset 206 as shown in FIG. 2. This sub-dataset 206 may contain, for example, "Joe Smith's data." The sub-dataset 206 could contain information associated with the example user Joe, such as a portion of Joe's user preferences, a portion of his purchase history and the like. While it may be appropriate for the server(s) 106 to process the sub-dataset 206 with knowledge that the data is associated with Joe Smith, this would likely be undesirable if that same data is distributed across a public network to many, potentially untrusted, computing devices 102.

Therefore, the data contained in the sub-dataset 206 may be anonymized by an anonymization technique 302 to completely protect the privacy of the data transmitted to the computing devices 102. One illustrative anonymization technique 302 comprises a substitution technique that is unknown and unbreakable by the computing devices 102. For example, every letter in the alphabet may be replaced by a number or a different letter. For some problems, such as sorting problems, it may be useful to maintain the ordinality of the data. Maintaining the ordinality (including reverse ordinality) will allow the anonymized data to sort in the same way as the original data. For example, A comes before B in the alphabet and if A is replaced by 12 and B replaced by 21 then the anonymized data will sort in the same order as the original data. The replacement of the original data with anonymous data may be thought of as a mapping of an original data value to an anonymized data value. In this example, the letter A maps to the number 12. An anonymized dataset 304 is created and the computing device 102 works on solving the problem contained in the anonymized dataset 304. The map 306 may be kept secret on the server(s) 106 and used to un-anonymize a solution received from the computing device 102.

To preserve anonymity of the original data, the specific mapping may be different for each computing device 102 receiving a sub-dataset 206. In other words, the mapping of "A=12" might only be true for one of the multiple computing device receiving a sub-dataset 206. The server(s) 106 may keep track of the various "maps" 306 used for each computing device 102 in order un-anonymize the data returned from the computing devices 102. Other anonymization techniques include adding fake data that is later filtered out. The fake data may be data that is intentionally inaccurate. For example, very similar data could be provided to multiple different computing devices 102, but fake data could be included in all but one of the sub-datasets 206. The original data could include a relationship between Joe and Fred and the fake data could include relationships between Joe and Sally for one computing device 102 and between Joe and John for a different computing device 102. This type of anonymization is similar to adding entropy into the dataset. Even if all the computing devices 102 collaborated in an attempt to un-anonymize the data they would not be able to determine if the true relationship is between Joe and Fred, Fred and Sally, or Fred and John.

In other implementations, the anonymization technique 302 may include passing the data of the sub-dataset 204 through a function that changes all the data according to the function. The function may be similar to an encryption algorithm. However, unlike some types of encryption, the anonymize dataset 304 will remain amenable to processing by the recipient computing devices 102. Similar to the map(s) 306, the function may be retained on the server(s) 106 to un-anonymize data received from the computing device 102.

The division of the dataset 202 itself also provides a level of anonymity. Each of the sub-datasets 206(1)-206(L) is like a piece of a puzzle and it may be difficult or impossible to identify the puzzle (i.e., the problem 108) from only a few pieces. Although a few illustrative anonymization techniques 302 are described above, any technique that provides an anonymized dataset 304 that can be processed in order to compute a solution yet obscures the original computational problem 108 and/or the original data 202 is encompassed within the scope of this disclosure.

Figure 4:
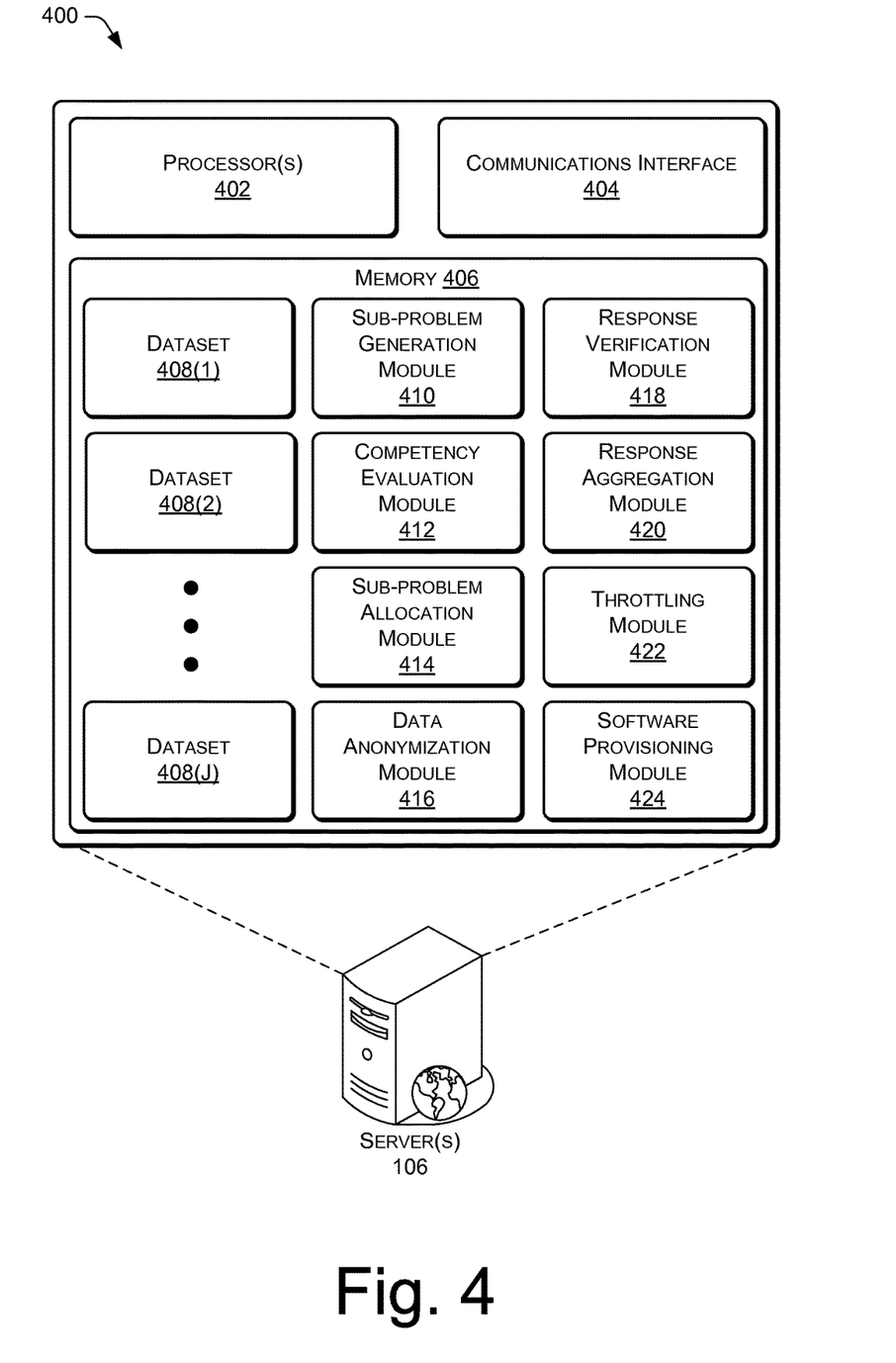
FIG. 4 is a block diagram showing the server(s) from FIG. 1 in greater detail.

FIG. 4 is a block diagram 400 showing the server(s) 106 of FIGS. 1 and 3 in greater detail. The server(s) 106 may include one or more processors 402, a communications interface 404, and a memory 406. The communications interface 404 may create a communicative connection with the network 104 and the computing devices 102. In some implementations, the communications interface 404 may communicate directly with one or more of the computing devices 102 without going through the network 104. The server(s) 106 may also contain other components found in server computers or computing devices in general.

The memory 406 may contain one or more datasets 408(1), 408(2), and 408(J). In some instances, J represents any integer greater than 1. The datasets 408(1), 408(2), and 408(J), collectively datasets 408, may each correspond to a respective problem, such as the problems 108(1), 108(2), and 108(M) shown in FIG. 1. In some implementations, the dataset 202 shown in FIG. 2 may be one of the datasets 408 stored in the memory 406.

The memory 406 may further include software modules as described below. Specific implementations may include more or less modules than described herein. A sub-problem generation module 410 may divide a computational problem 108 into a plurality of sub-problems that may be solved autonomously by one of the multiple computing devices 102. Similarly, the sub-problem generation module 410 may also divide a dataset 408 into a plurality of sub-datasets and the instructions 204 may be divided into a plurality of sub-instructions 208 as shown in FIG. 2.

The computational problems 108 may be solved primarily by the computation performed on the multiple computing devices 102. However, the specific capabilities and competencies of each computing device 102 may not be known by the server(s) 106. The competency evaluation module 412 may attempt to make a best guess regarding the competency of a computing device 102 based on proxy information that is likely to correlate to such things as processing speed, memory, and network connection speed. The proxies may include network information (e.g., mobile device specific network, distance between the computing device 102 and the server(s) 106), operating system, web browser software, web browser plug-ins, screen resolution, and the like. The competency evaluation module 412 may also send a test problem to determine the speed and accuracy with which a computing device 120 solves the test problem. The test problem, or another transfer of data to and from the computing device, may allow the competency evaluation module 412 to detect a network connection speed, a network distance over which packet between the server(s) 106 and the computing device 102, and a degree of packet loss between the server(s) 106 and the computing device 102. The competency evaluation module 412 may repeat the analysis or testing of the computing device 102 each time a new problem is sent to the computing device 102, at a regular interval such as every minute, or with some other frequency.

A sub-problem allocation module 414 may assign one of the sub-problems and corresponding sub-dataset and sub-instructions to one of the computing devices 102. The sub-problems may be assigned randomly or based on a determination made by the sub-problem allocation module 414. For example, one illustrative determination may consider input from the competency evaluation module 412. A given problem 108 may be divided into sub-problems of varying complexity and sub-datasets of varying sizes. The competency of available computing devices 102 may be one factor used to allocate the sub-problems. For example, a computing device 102 with the highest processing speed may be assigned the most computationally intensive sub-problem and a computing device 102 with the fastest network connection may be assigned the largest sub-dataset.

A data anonymization module 416 may anonymize a sub-dataset before it is sent to a computing device 120. The data anonymization module 416 may implement the anonymization technique 302 of FIG. 3. When a response is received from a computing device 102, the data anonymization module 416 may also reverse the anonymization process to un-anonymize the response. In implementations in which separate mappings or functions are used for different computing devices 102 the data anonymization module 416 may also keep track of the correlations between a particular computing device 102 and the map or function used to anonymize the data sent to that computing device 102. The data anonymization module 416 may store the functions and map(s) 306 shown in FIG. 3.

A response verification module 418 may analyze a solution to the sub-problem received from the computing device 102. The response verification module 418 may determine if the solution is accurate, and if the solution is inaccurate the response verification module 418 may also diagnose a probable source of the error. The analysis may occur either before or after the response is un-anonymized. For certain types of optimization and sorting problems, once a result is known it is relatively easy to test whether or not that result is correct. Accordingly, testing the accuracy of a solution may be a relatively trivial task compared to developing the solution in the first place. The response verification module 418 may also verify the accuracy of a response by comparing responses to the same sub-problem received from multiple computing devices 102. This comparison may be performed on the data received from a computing device 102 before un-anonymization. In some implementations, certain trusted computing devices may be assumed to provide accurate solutions. This assumption may be based on past work performed by the trusted computing devices. In this implementation, detailed analysis of the solution may be skipped and an accurate solution may be inferred based on a user identifier or device identifier that is associated with a trusted computing device.

A response aggregation module 420 may be configured to combine solutions from multiple sub-problems generated by multiple computing devices 102 in order to assemble a solution to the original problem 108. The solutions to the various sub-problems may be combined as soon as an answer is received by the server(s) 106 or the response aggregation module 120 may wait until answers to each of the sub-problems are received before combining the answers. In some implementations, the analysis of accuracy and the act of combining multiple sub-problem answers may each be a separate sub-problem that is presented to one or more of the computing devices 102 for a solution. This may minimize the processing performed by the server(s) 106.

A throttling module 422 may limit a number of sub-problems from a computational problem 108 that are assigned to any one computing device 102. The throttling module 422 prevents any one computing device 102 from accessing too many pieces of the puzzle. Certain computing devices 102 such as those that are particularly fast or frequently available to participate in a distributed computing system may complete one sub-problem and then receive other sub-problems from the same original computational problem 108. The throttling module 422 may prevent any one computing device 102 from receiving too many sub-problems by preventing the server(s) 106 from assigning additional more than a threshold number of sub-problems to any one computing device 102. This threshold number may be adjusted based on the level of privacy required, a difficulty of un-anonymizing the data, a number of sub-problems that the problem 108 was divided into, the size of datasets 408 provided, a level of trust for the recipient computing device 102, or other factors. For some sub-problems it may be possible to provide a single computing device with all or essentially all of the data without compromising anonymity. This may vary based on the nature of the sub-problem to be solved and the dataset 408 which is provided to solve that sub-problem. Thus, the threshold number may also be set manually based on a subjective consideration privacy issues associated with a given dataset 408.

The threshold number may also be implemented as a percentage so that no single computing device 102 receives more than, for example, 10% of the total data associated with a problem 108. Rather than ceasing to use a computing device 102 because that computing device 102 has exceeded the threshold number of sub-problems, the throttling module 422 and/or the sub-problem allocation module 414 may assign a sub-problems from a different computational problem 108 (i.e., one for which the computing device 102 has not exceeded the threshold).

The memory 406 may also include a software provisioning module 424. While in some implementations the computing devices 102 may process the sub-problems using software that is already available on the computing devices 102, such as a web browser or an operating system, in other implementations specialized software for answering a sub-problem may be utilized by the computing devices 102. This specialized software may be made available to the computing devices 102 by the software provisioning module 424. Illustrative types of software for solving the sub-problems may include stand-alone applications, web browser toolbars, browser plug-ins, etc. Once present on the computing device 102, this software may also provide information to the competency evaluation module 412 about the speed, memory, and network connectivity of the computing device 102.

Figure 5:
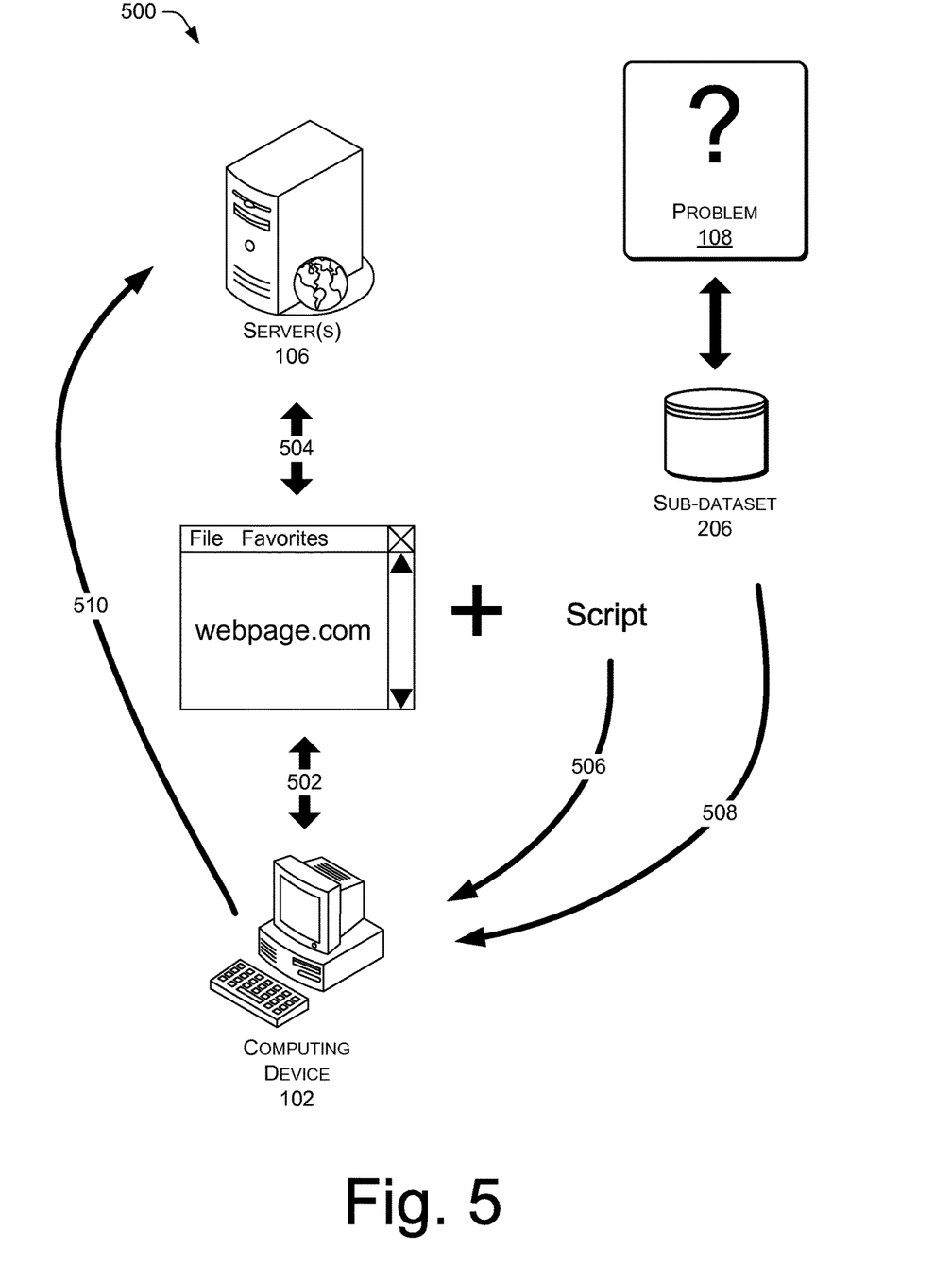
FIG. 5 shows a computing device receiving a webpage from a server along with a sub-dataset and a script for processing the sub-dataset.

FIG. 5 shows an illustrative implementation of a distributed computing system. In this illustration, a computing device 102 sends a request 502 to a server(s) 106 and receives a webpage in reply 504 from the server(s) 106. The server(s) 106 may provide a script for interacting with a webpage along with markup language (e.g., html, xtml, and the like) coding for the webpage. The server(s) 106 may also send other script over path 506. This additional script may instruct a web browser of the computing device 102 to work on solving a sub-problem of a larger computational problem 108 such as any of the problems 108(1), 108(2), or 108(M) shown in FIG. 1. The script provided over path 506 may be additional to any "regular" script included with the webpage (e.g., JavaScript® for controlling mouseovers). In some implementations, the script provided over path 506 may also determine a duration that the webpage has been open and a level of user interaction with the webpage.

Depending on the size and complexity of the computational problem 108, the data necessary to solve that computational problem 108 may be divided into multiple sub-datasets 206 as shown in FIG. 2. One of these sub-datasets 206 may also be provided to the computing device 102 as shown in path 508. The computing device 102 may solve a piece of the problem 108 by applying the instructions provided by the script to process the data in the sub-dataset 206. The script may provide the sub-instructions 208 shown in FIG. 2. To minimize any potentially negative impacts on the operation of the computing device 102, the number and complexity of distributed computing tasks processed by the computing device 102 may be reduced if performance would be impacted. For example, if the web browser on the computing device 102 has multiple tabs open, then processing of distributed computing tasks may be temporarily suspended. This regulation to minimize negative effects on the computing device 102 may be implemented by the script or the server(s) 106 (e.g., the competency evaluation module 412 and/or the sub-problem allocation module 414).

Once the sub-dataset 206 is processed by the computing device 102 according to the script, the answer is returned to the server(s) 106 along path 510. At the server(s) the answer may be evaluated for accuracy by comparison with other answers to the same sub-problem from other computing devices, analyzing a portion of the answer, analyzing a format of the answer, and the like. The accurate answer may be combined with responses from other computing devices 102 to assemble a solution to the computational problem 108. This may be implemented by, for example, the response verification module 418, and the response aggregation module 420 shown in FIG. 4.

Illustrative Processes

The processes discussed below are each illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 6:
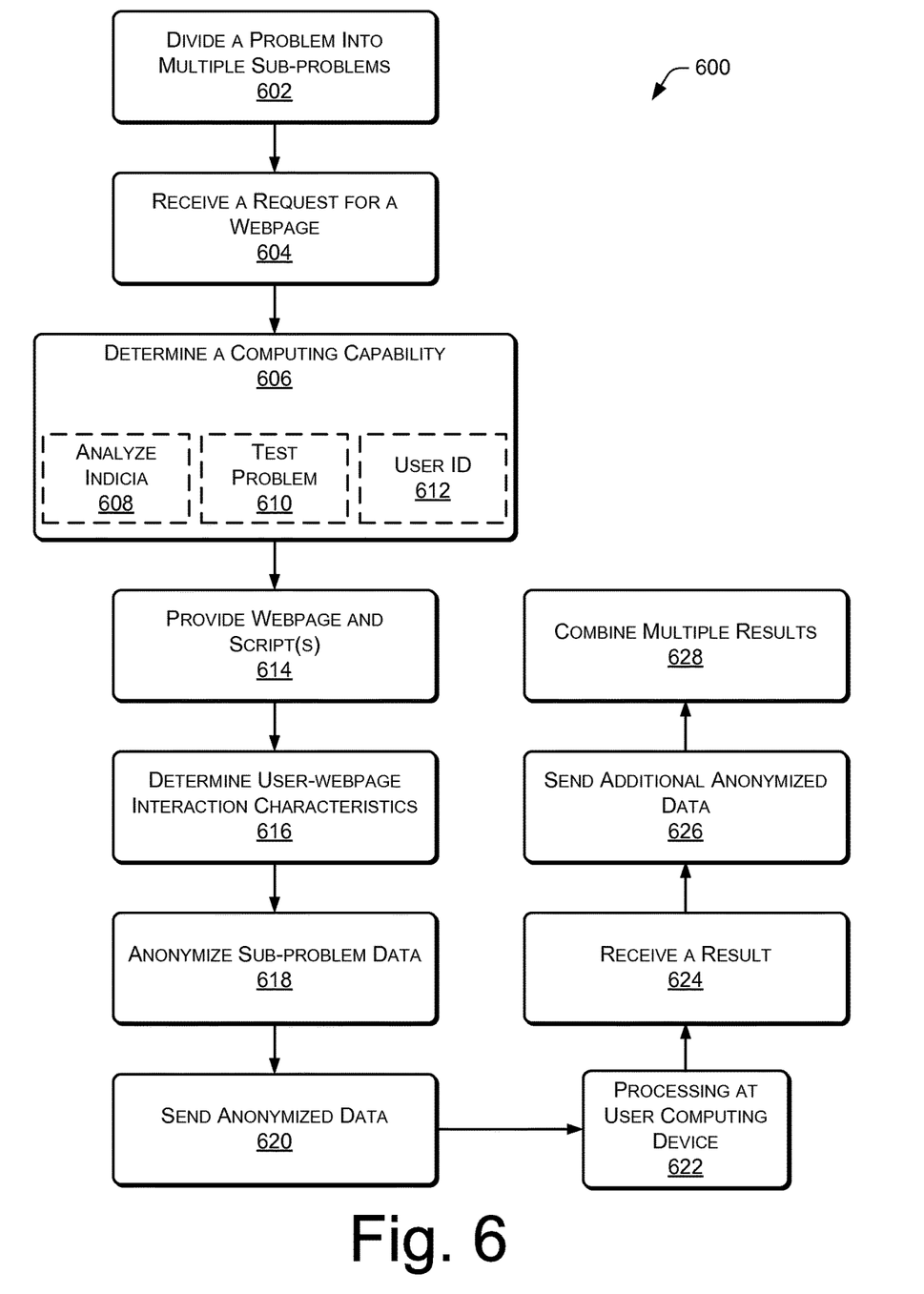
FIG. 6 is a flow diagram of an illustrative process for dividing a computational problem into sub-problems and combining results of the sub-problems to solve the computational problem.

FIG. 6 shows an illustrative process 600 for using a scripting language to implement a distributed computing solution for solving a computational problem. This process 600 may be implemented by the systems and paths shown in FIG. 5. Although the process 600 may be implemented on the server(s) 106 it may also be implemented on any other computing device.

At block 602, a problem is divided into multiple sub-problems. The problem may be any of the problems 108(1), 108(2), or 108(M) shown in FIG. 1. The division may be equal or the problem may be divided into sub-problems of varying size and/or complexity.

At block 604, a request for a webpage is received from a user computing device such as the computing devices 102 shown in FIGS. 1-3 and 5. The requested webpage may be unrelated to the problem that is subdivided at block 602. The request may be a request for a webpage only and not include a request specifically for a one of the multiple sub-problems.

At block 606, a computing capability of the user computing device is determined. In one implementation represented at block 608, the computing capability of the user computing device may be determined by analyzing indicia of computing capability present in the request for the webpage. The request for the webpage may include information about the requesting user computing device such as the network from which the request originated, an Internet Protocol (IP) address associated with the request, via headers associated with the request, an operating system installed on the user computing device, a web browser making the request, browser plug-ins, a display resolution, and the like. The request itself may also be analyzed to identify other indicia such as a packet speed, a level of packet loss, etc. This information can be utilized to infer a level of computing capability. The computing capability of the user computing device may also be determined by looking at historical performance of the user computing device when asked to solve previous problems. A user identifier are device identifier may be used to associated the user computing device with its past performance history.

At block 610, instead of or in addition to looking at indicia, a test problem may be sent to the user computing device to test its computing capability. The test problem 210 may have a known solution against which the accuracy of an answer provided by the user computing device can be compared. The speed at which the answer is generated by the user computing device may provide a direct measure of computing capability. A test problem may also be sent to the user computing device if there is a reason to suspect that the user computing device may be providing incorrect answers. For example, if the user computing device provides an answer in a short period of time relative to the complexity of the problem that may suggest an error or even deliberate faking of reply data. Additionally, a user identification (ID) may be used at block 612 to identify a computing capability. The user identification may be associated with past problem solving activity from which computing capability can be inferred (e.g., the speed at which this computing device solved problems in the past). Additionally, the user may provide information about his or her computing device (e.g., processor type, amount of RAM, graphics card, and the like) and associated this information with the user identification. If the user identification is known this specific information may be retrieved in order to determine directly the computing capability of the user computing device.

At block 614, a webpage and commands in a scripting language for processing one of the multiple sub-problems are provided to the user computing device. The commands may be selected at least in part on the computing capability of the user computing device. For example, the scripting language with instructions for a computationally intensive sub-problem may be sent to a user computing device with a high processing speed. In some implementations the scripting language commands may be run after the webpage loads to prevent delays in loading the webpage. As discussed above, other scripting language commands unrelated to processing the sub-problem (e.g., "regular" scripting language commands related to displaying or interacting with the webpage) may also be included in the webpage. This regular scripting language may be loaded at the same time as the webpage or at another time.

At block 616, the scripting language commands may determine user-webpage interaction characteristics. The characteristics may include a duration that the webpage has been open and a level of user interaction with the webpage. This determination may allow for inferences to be made about capability of the web browser to process additional scripting language commands. For example, some users may open a web browser and view a webpage, but then began another activity (e.g., interacting with word processing software) without closing the web browser or the webpage. In this situation, the web browser could potentially be used for processing the scripting language commands without impacting the user experience. Alternatively, if the user is actively interacting with the webpage, asking the browser to process additional scripting language commands may cause delays or otherwise negatively impact the user experience.

At block 618, data representing one of the multiple sub-problems is anonymized. The anonymization may be performed by any of the anonymization techniques discussed above in connection with FIG. 3 such as addition of fake data, mapping, transforming with a function, etc. The data representing one of the multiple sub-problems may be the same or similar to the sub-datasets 206 shown in FIG. 2.

At block 620, the anonymized data is sent to the user computing device. The anonymized data is processed at the user computing device at block 622 as described above and the process 600 returns to operations performed on the server at block 624 where a result derived from processing the anonymous data according to the scripting language commands is received.

At block 626, additional anonymized data may be sent depending on the determination made at block 616. For example, if the web browser is likely able to perform additional processing without impacting the end user experience, additional anonymized data may be sent to the user computing device.

At block 628, the result is combined with other results, possibly calculated by other user computing devices, to generate an answer to the problem.

Figure 7:
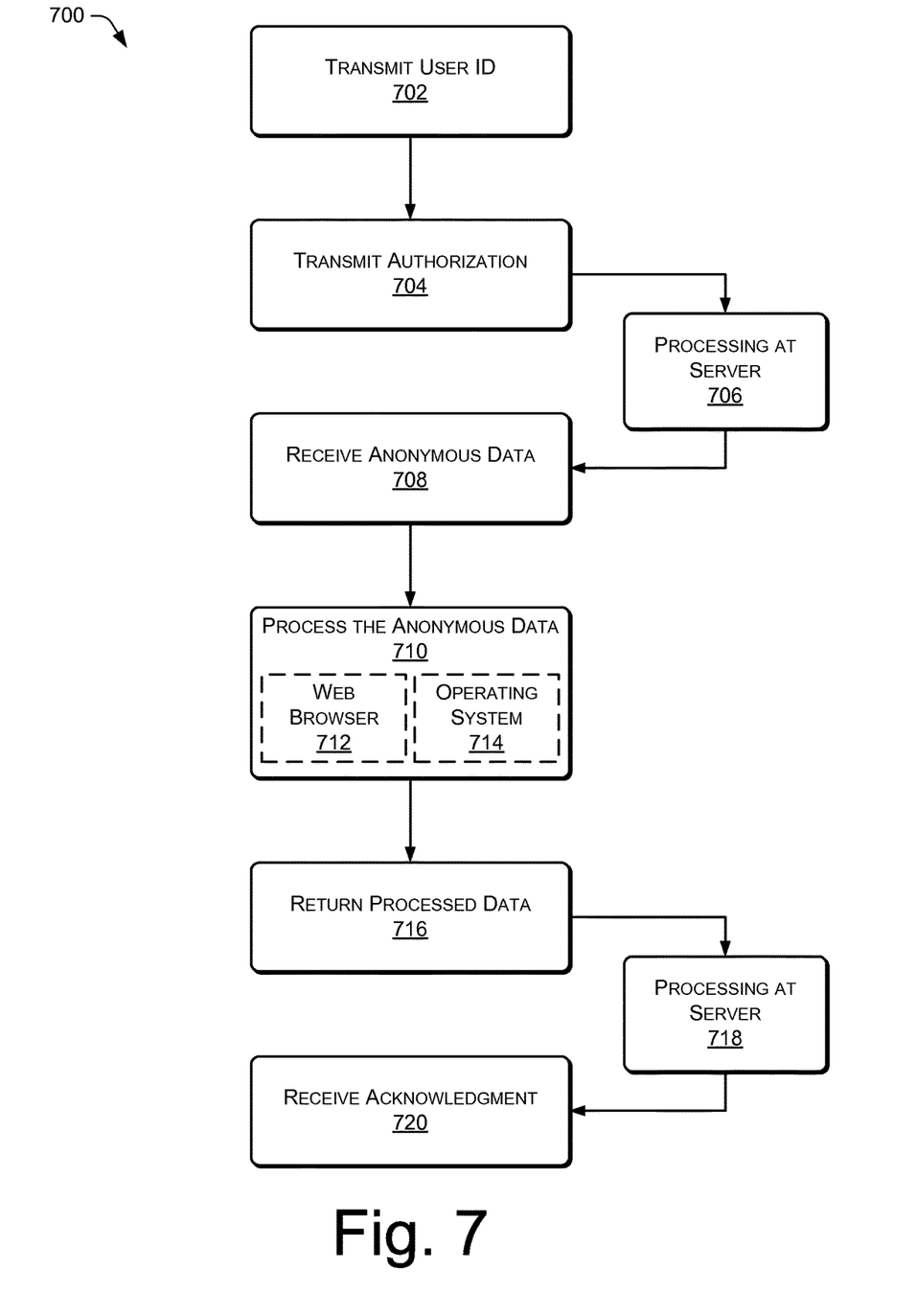
FIG. 7 is a flow diagram of an illustrative process for receiving and processing anonymous data at a computing device.

FIG. 7 shows an illustrative process 700 for receiving and processing anonymous data at a computing device. The computing device may be the same or similar to the computing devices 102 shown in FIGS. 1-3 and 5.

At block 702, the computing device transmits a unique user identifier (ID) to a server. The server may be the same or similar as the server(s) 106 shown in FIGS. 1-5. The unique user ID may be a user name, a password, a login, an account number, payment information (e.g., a credit card number), a serial number, and the like, possibly including any combinations of the above. The unique user ID may also include an indication of a computing capability of the computing device. For example, the unique user ID may be appended with data about the computing device sending the unique user ID, the unique user ID itself may include information about computing capability (i.e., analogous to the decoding of a vehicle identification number (VIN) to obtain information about the vehicle), the unique user ID may also be associated with a stored record such as, for example, a cookie that contains an indication of the computing capability of the computing device.

At block 704, the computing device may transmit an authorization to the server indicating availability for participation in a computational problem as part of a distributed computing system. The authorization may be explicitly entered by a user of the computing device or it may an implicit authorization. In some implementations, the authorization may be given in advance once as an explicit authorization and that provides a "default" setting which is a source of subsequent implicit authorization. In implementations using a web browser, components of the web browser such as a browser toolbar may provide a user interface for the user to select whether or not authorization will be transmitted. The authorization may also be provided by placing a cookie on the computing device in which case a willingness to accept cookies is a form of implicit authorization. Other techniques for indicating and transmitting authorization are, of course, possible.

At block 706, the process 700 shifts to the server where processing is performed. The processing at block 706 may be similar to the process 600 shown in FIG. 6.

At block 708, the computing device receives anonymous data from the server. This anonymous data may be the same as the anonymized dataset 304 shown in FIG. 3. The anonymous data may comprise data sufficient to answer a sub-problem of the computational problem but the computational problem itself may not be identifiable from the anonymous data. That is to say, the data received by the computing device cannot be reverse engineered to identify the original computational problem in some instances.

At block 710, the computing device processes the anonymous data using local resources (e.g., resources of the computing device rather than the server) according to instructions provided by the server. The processing may be implemented by pre-existing software such as a web browser 712 or an operating system 714 without downloading or installation of specialized software. In one implementation, instructions may be contained in a scripting language and interpreted by the web browser although other languages interpreted from source code or bytecode as well as languages compiled to native machine code are equally applicable. In some implementations, the processing may be performed as a background task that is not readily apparent to a user of the computing device.

At block 716, the processed data is returned to the server. The processing at the server, at block 718, may include verifying that the processed data is correct and combining responses from multiple computing devices to solve the computational problem. This type of processing may be implemented, for example, by the response verification module 418 and the response aggregation module 420 shown in FIG. 4.

At block 720, the computing device receives an acknowledgment that the server has processed the data at block 718. The acknowledgment may be associated with the unique user ID transmitted in block 702. In some implementations, the acknowledgment may include an incentive or reward. By associating the acknowledgment with the user ID the incentive can be provided to user whose computing device did the processing at block 710. The incentives could provide rewards for accurate processing of anonymous data, fast processing, processing a large number of sub-problems, and the like. The incentives may take the form of coupons, discount codes, free goods or services, and the like. In some implementations, the incentives may be tied to the server which originally provided the anonymous data. For example, if a user authorizes his or her computing device to participate in a distributed computing system managed by a server of an online merchant, that merchant may provide an incentive which can be redeemed when shopping at the merchant. The incentive may be structured in any number of ways such as, for example, providing a free download of an electronic book after a certain number of megabytes of data have been processed.

Figure 8A:
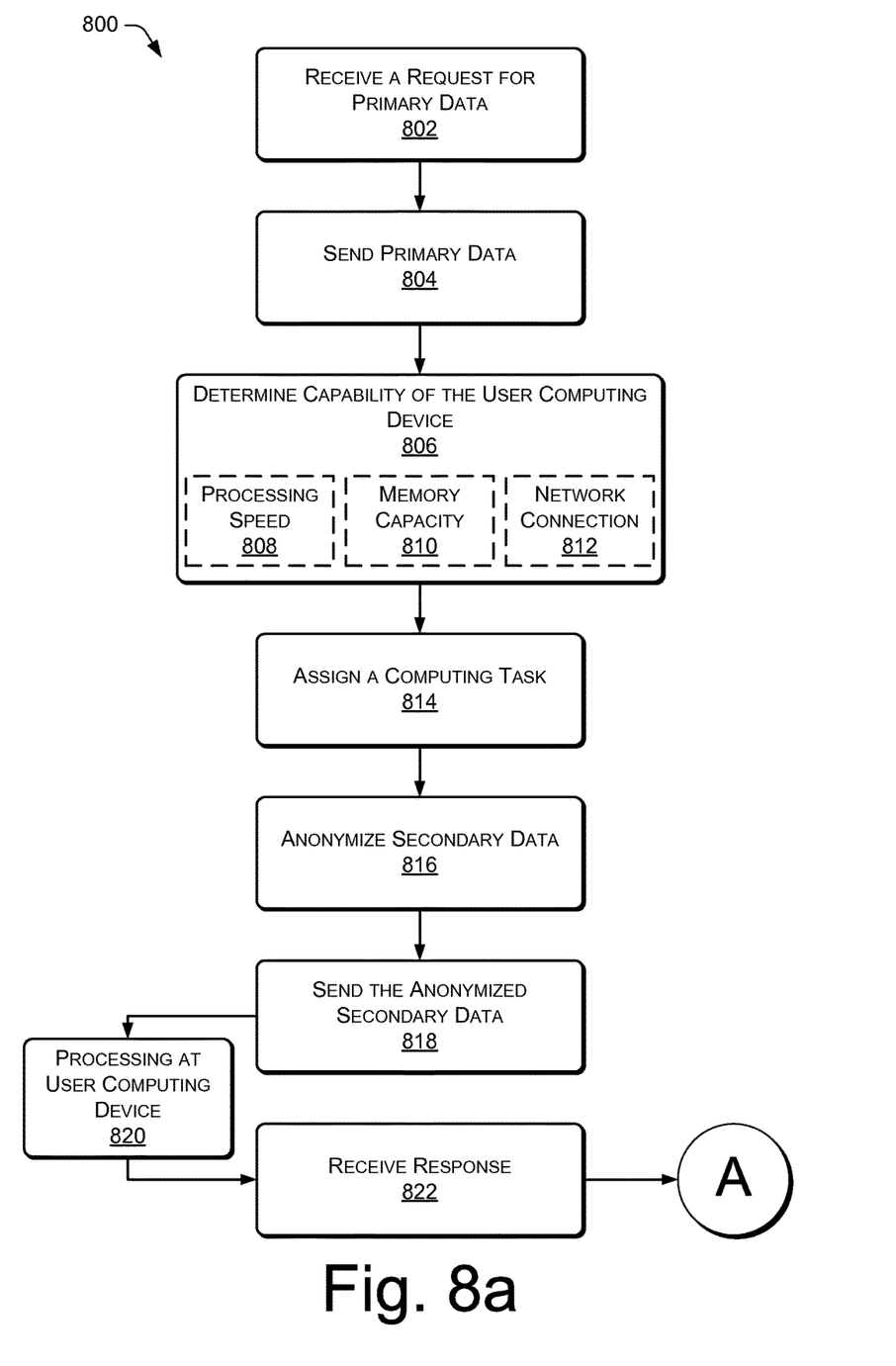
FIGS. 8a-8b depict a flow diagram of an illustrative process for assigning tasks to a computing device and tracking completion of the computing tasks.
Figure 8B:
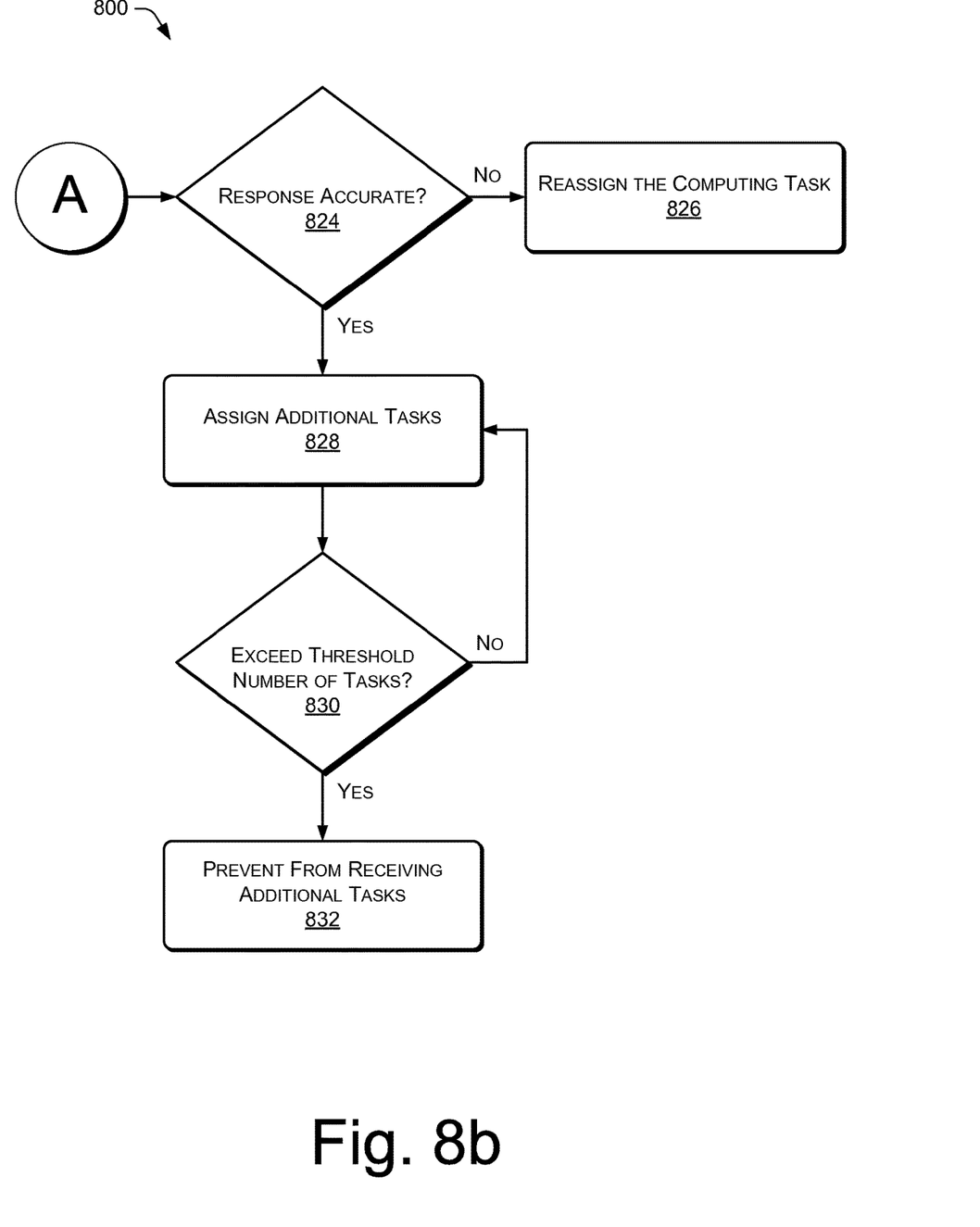

FIG. 8 shows an illustrative process 800 for assigning computing tasks to a computing device and tracking completion of the computing tasks. The process 800 may be performed on the server(s) 106 shown in FIGS. 1-5 or on another type of computing device. The computing tasks may be solving a sub-problem of a larger computational problem such as one of the problems 108 shown in FIG. 1.

At block 802, a request is received from a user computing device to obtain primary data. The primary data may be thought of as a data desired by a user of the user computing device. The primary data may be a webpage, a file, an e-mail, an instant message, or another type of data.

At block 804, the primary data is sent to the user computing device. The primary data may be sent through the network 104 as shown in FIG. 1.

At block 806, a capability of the user computing device may be determined. Determining the capability of the user computing device may include determining one or more of processing speed 808, memory capacity 810, and network connection speed 812. In some implementations, this determination may be performed by the competency evaluation module 412 shown in FIG. 4.

At block 814, a computing task is assigned to the user computing device based on the determined capability of the user computing device. For example, more difficult tasks may be assigned to user computing devices with greater capabilities.

At block 816, secondary data necessary to complete the computing task may be anonymized by creating a data map that maps data values within the secondary data to other data values. In some implementations, the data map may consist of a simple substitution in which, for example, each letter of the alphabet is replaced with a different number. The map may maintain the ordinality of the secondary data so that the secondary data sorts in the same way even after anonymization. Other types of anonymization are discussed above in connection with the anonymization technique 302 shown in FIG. 3. The secondary data may be thought of as data that is not specifically requested by the user computing device. The secondary data may be related to a problem that the server is attempting to solve by utilizing the user computing device as one node in a distributed computing system. In some implementations, the secondary data may be further instructions in the same scripting language, another scripting language, or any other type of data.

At block 818, the anonymized secondary data is sent to the user computing device. In order to protect the anonymity of the secondary data the map used to anonymize the secondary data at block 816 is not sent to the user computing device. The anonymized secondary data may be sent to the user computing device through the network 104 shown in FIG. 1.

At block 820, the process 800 moves to the user computing device and the anonymized secondary data is processed by the user computing device. This processing may be similar to operations performed at block 710 shown in FIG. 7. At block 822, a response is received from the user computing device that includes the results or answers calculated from processing the anonymized secondary data.

At decision point 824, the response from the user computing device is analyzed to determine if it is accurate by comparison with other responses to the same computing task from other user computing devices, analysis of a portion of the response, analysis of the format of the response, analysis of past performance of the user computing device, or other techniques. In some implementations, this analysis may be performed by the response verification module 418 of the server(s) 106 shown in FIG. 4. If the response is not accurate, the process 800 proceeds along the "no" path to block 826 and the computing task is reassigned to a different user computing device. By evaluating responses and reassigning computing tasks, the distributed computing system has a robustness that is able to handle failure of any given user computing device.

If the response from the user computing device is accurate, the process 800 proceeds along the "yes" path to block 828. At block 828, an additional computing task may be assigned to the user computing device. A computing device that provides accurate results may receive more tasks to work on assuming that the user computing device remains available to participate in the distributed computing system. In some implementations, user computing devices with a history of providing accurate results may be preferentially given more tasks to complete in order to minimize sending computing task to other unknown and potentially unreliable devices. For example, the sub-problem allocation module 414 shown in FIG. 4 may consider past reliability when allocating sub-problems to different user computing devices.

At decision point 830, a number of computing tasks completed by the user computing device is determined. Although it may be desirable to have competent user computing devices receive multiple computing tasks, this advantage may be balanced by the risk of the user computing device reverse engineering or un-anonymizing the anonymized secondary data. Such non-anonymizing is more likely if the user computer device has access to a large portion of the entire dataset. To prevent this from occurring, the number of computing tasks completed by the user computing device exceeds a threshold the process 800 proceeds along the "yes" route to block 832. At block 832, the user computer device is prevented from receiving additional computing tasks. In some implementations, the user computing device may be allowed to receive additional computing tasks so long as those additional computing tasks are related to a different problem than the earlier computing tasks. Regulation of the number of computing tasks assigned to a given user computing device may be controlled by the throttling module 422 shown in FIG. 4.

If the number of computing tasks does not exceed the threshold, then the process 800 may return to block 828 and assign additional computing tasks to the user computing device. This process may repeat until the computing device has received the threshold number of computing tasks or until the computing device is otherwise unable to process additional computing tasks.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
  receiving, by one or more computing devices, a request from a computing device for a webpage;
  determining, by at least one computing device of the one or more computing devices, a computing capability of the computing device;
  transmitting, by at least one computing device of the one or more computing devices, the webpage to the computing device, the webpage including one or more commands in a scripting language that are selected based at least in part on the computing capability of the computing device;
  receiving, by at least one computing device of the one or more computing devices, duration data representing a duration that the webpage has been open on the computing device and interaction data representing a level of user interaction with the webpage on the computing device;
  based at least in part on the duration data and the interaction data, transmitting, by at least one computing device of the one or more computing devices, a computational problem to the computing device; and
  receiving, by at least one computing device of the one or more computing devices, a result derived from processing the computational problem by the computing device according to the one or more commands in the scripting language.

2. The method of claim 1, wherein the determining the computing capability of the computing device comprises analyzing an indicia of computing capability included in the request.

3. The method of claim 2, wherein the indicia of computing capability comprises at least one of a network from which the request originated, an Internet protocol (IP) address associated with the request, a header associated with the request, an operating system installed on the computing device, a web browser installed on the computing device, a browser plug-in installed on the web browser installed on the computing device, a display resolution of the computing device, a packet speed of the request, or a level of packet loss of the request.

4. The method of claim 1, wherein the determining the computing capability of the computing device comprises referencing past problem-solving activity performed by the computing device.

5. The method of claim 1, wherein the determining the computing capability of the computing device comprises transmitting, by at least one computing device of the one or more computing devices, a test problem to the computing device and determining the computing capability of the computing device based at least in part on a response to the test problem.

6. The method of claim 1, further comprising, based at least in part on the duration data and the interaction data, transmitting by at least one computing device of the one or more computing devices, an additional computational problem to the computing device.

7. One or more non-transitory computer-readable storage media storing computer-executable instructions to perform acts comprising:
- accessing a request from a computing device to obtain a webpage;
- causing the webpage to be sent to the computing device;
- determining a computing capability of the computing device;
- assigning, based at least in part on the computing capability, a computing task to the computing device;
- causing data representing the computing task and commands in a scripting language to be sent to the computing device for processing the computing task;
- determining whether a response received from the computing device is an accurate or inaccurate solution to the computing task;
- in response to determining that the response is an accurate solution to the computing task, assigning an additional computing task to the computing device; and
- in response to determining that the response is an inaccurate solution or corrupted, reassigning the computing task to a different computing device.

8. The non-transitory computer-readable storage media of claim 7, wherein the computing capability of the computing device comprises at least one of processing speed, memory capacity, or network connection speed.

9. The non-transitory computer-readable storage media of claim 7, wherein the determining whether the response received from the computing device is an accurate or inaccurate solution to the computing task comprises analyzing a performance history of the computing device and inferring an accuracy of the response to the computing task based at least in part on the performance history.

10. The non-transitory computer-readable storage media of claim 7, wherein the determining whether the response received from the computing device is an accurate or inaccurate solution to the computing task comprises comparing the response with other responses to the same computing task received from different computing devices.

11. The non-transitory computer-readable storage media of claim 7, wherein the determining whether the response received from the computing device is an accurate or inaccurate solution to the computing task comprises analyzing a portion of the response that is less than the whole response or analyzing a format of the response.

12. The non-transitory computer-readable storage media of claim 7, wherein the acts further comprise diagnosing a probable source of an error that causes the inaccurate solution.

13. The non-transitory computer-readable storage media of claim 7, wherein the acts further comprise:
- accessing a completed computing task received from the computing device;
- determining a number of computing tasks completed by the computing device;
- determining that the number of computing tasks completed by the computing device exceeds a threshold, preventing the user computing device from receiving additional computing tasks; and
- determining that the number of computing tasks completed by the computing device does not exceed the threshold, assigning an additional computing task to the computing device.

14. A system comprising:
- one or more processors; and
- one or more memories coupled to the one or more processors, the one or more memories including instructions that, upon execution, cause the system to:
- receive a request from a computing device for a webpage;
- determine a computing capability of the computing device;
- transmit the webpage to the computing device, the webpage including one or more commands in a scripting language that are selected based at least in part on the computing capability of the computing device;
- receive duration data representing a duration that the webpage has been open on the computing device and interaction data representing a level of user interaction with the webpage on the computing device;
- based at least in part on the duration data and the interaction data, transmit a computational problem to the computing device; and
- receive a result derived from processing the computational problem by the computing device according to the one or more commands in the scripting language.

15. The system of claim 14, wherein the instructions to determine the computing capability of the computing device include instructions that upon execution cause the system to do at least one of:
- analyze an indicia of computing capability included in the request;
- reference past problem-solving activity performed by the computing device; or
- transmit a test problem to the computing device and determining the computing capability of the computing device based at least in part on a response to the test problem.

16. The system of claim 14, wherein the one or more memories further include instructions to, based at least in part on the duration data and the interaction data, transmit an additional computational problem to the computing device.

17. A computer-implemented method comprising:
- accessing a request from a computing device to obtain a webpage;
- causing the webpage to be sent to the computing device;
- determining a computing capability of the computing device;
- assigning, based at least in part on the computing capability, a computing task to the computing device;
- causing data representing the computing task and commands in a scripting language to be sent to the computing device for processing the computing task;
- determining whether a response received from the computing device is an accurate or inaccurate solution to the computing task;
- in response to determining that the response is an accurate solution to the computing task, assigning an additional computing task to the computing device; and in response to determining that the response is an inaccurate solution or corrupted, reassigning the computing task to a different computing device.

18. The method of claim 17, wherein the determining whether the response received from the computing device is an accurate or inaccurate solution to the computing task comprises at least one of:

analyzing a performance history of the computing device and inferring an accuracy of the response to the computing task based at least in part on the performance history;

comparing the response with other responses to the same computing task received from different computing devices; or analyzing a portion of the response that is less than the whole response or analyzing a format of the response.

19. The method of claim 17, further comprising diagnosing a probable source of an error that causes the inaccurate solution.

20. The method of claim 17, further comprising:

accessing a completed computing task received from the computing device;

determining a number of computing tasks completed by the computing device;

determining that the number of computing tasks completed by the computing device exceeds a threshold, preventing the user computing device from receiving additional computing tasks; and determining that the number of computing tasks completed by the computing device does not exceed the threshold, assigning an additional computing task to the computing device.

* * * * *